United States Patent Office 3,496,796
Patented Feb. 24, 1970

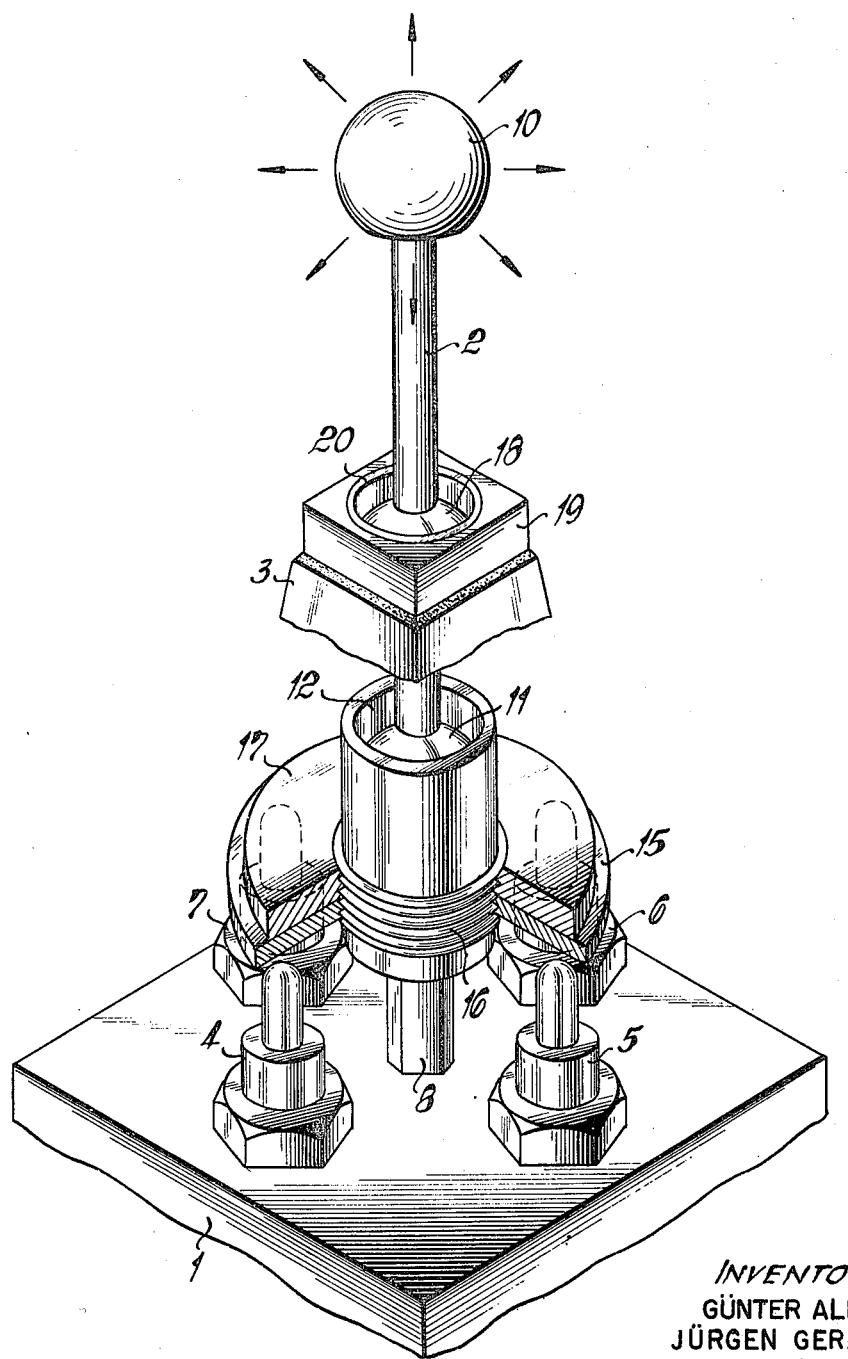

3,496,796
CARDANIC ACTUATING MECHANISM FOR HYDRAULIC VALVES
Günter Alpers and Jürgen Gerber, Dortmund, Friedrich Fichtner, Bochum-Weitmar, and Karl-Heinz Diviak, Dortmund-Brackel, Germany, assignors to Orenstein-Koppel und Lubecker Maschinenbau Aktiengesellschaft, Dortmund-Dorstfeld, Germany
Filed May 1, 1968, Ser. No. 725,884
Claims priority, application Germany, May 9, 1967, O 12,482
Int. Cl. G05g 9/00
U.S. Cl. 74—471          3 Claims

ABSTRACT OF THE DISCLOSURE

An actuating mechanism for a multiple valve, in which an actuating lever is, by means of one ball, pivotally journalled in stationary bearing means and is, by means of a second ball, displaceably journalled in a movable sleeve operatively connected to the lever means for tilting said sleeve and thereby a swash-plate connected to said sleeve.

---

Figure 1:
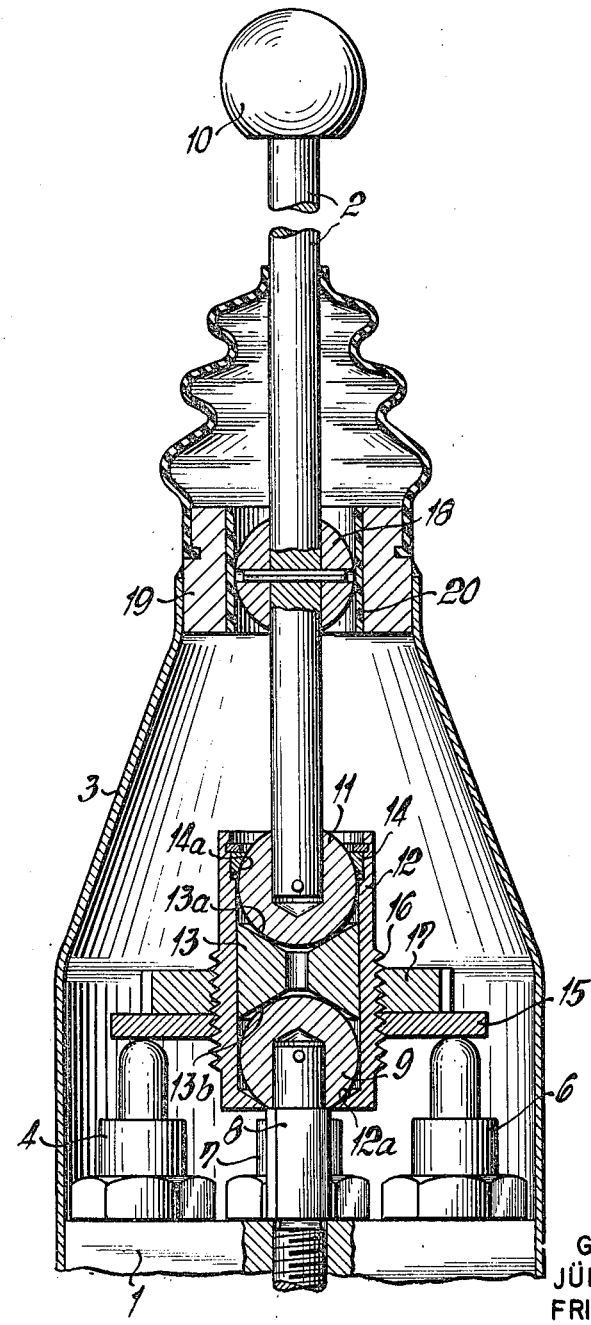

The present invention relates to a cardanic actuating mechanism for hydraulic valves, and more, specifically, concerns the actuation of a block valve for hydraulic circuits with two or more consumers by means of a cardanically journalled actuating lever, said block valve being designed as a multi-control valve.

A device has become known according to which four hydraulic control valves are in a square combined to a block and actuated by means for an actuating lever journalled in a ball and equipped with a swash-plate, said lever being movable in all directions. Such an arrangement requires that it is to be mounted in the operator's cab directly adjacent the driver. It is unavoidable that the driver's cab already due to slight leakages at the screw connections, becomes soiled by oil whereby the clothing of the operator is soiled and the possibility of slipping on the oily floor, with the result of an accident, exists. Furthermore, the operator is exposed to the temperatures occurring due to the heating of the oil in the hydraulic circuit and is also exposed to dangers inherent to a break in the conduit system.

It is an object of the present invention to provide a mechanical actuation of valves of the above-mentioned type which will make it possible to mount the block valve outside the driver's cab without, however, affecting the possibility of actuating the control lever in all directions.

It is another object of this invention to provide an actuating mechanism for block valves for hydraulic circuits with two or more consumers, which will be simple in construction and operation.

These and other objects and advantages of the invention will appear more clearly from the following specification in connection with the accompanying drawings, in which:

FIGURE 1 illustrates a longitudinal section through the journalling of the actuating lever and also shows a partial view of the multi-valve; and FIGURE 2 is an isometric view of the multi-valve according to the invention with actuating lever and partially broken out swash-plate.

The objects set forth above have been realized by an actuating mechanism which is characterized in that the actuating lever is journalled by means of a first ball displaceable in a bushing and having said actuating lever connected to said first ball, and is furthermore journalled by means of a second ball having the end of said actuating lever connected thereto and movable in a sleeve, said sleeve carrying a swash-plate and having that end of said sleeve which is remote from said second ball, housing a third ball which by means of a threaded stud fixedly connected to the valve housing rests upon the latter.

Referring now to the drawings in detail, the actuating mechanism comprises primarily a multi-valve 1 and a housing 3 for journalling the actuating lever 2. Centrally into the multi-valve 1 with the four individual valves 4, 5, 6 and 7 there is threaded a threaded stud 8 the free end of which carries a ball 9. That end of the actuating lever 2 which is located opposite the actuating knob 10 has fastened thereto a ball 11 which is guided in a sleeve 12. The distance between the balls 9 and 11 is determined by a spacer ring 13 provided with the inclined surfaces 13a and 13b. By means of a ring 14 which is provided with inclined surfaces 14a, ball 11 is prevented from sliding out of sleeve 12. An extension 12a of sleeve 12 serves the same purpose for the ball 9. The outside of sleeve 12 has connected thereto a swash-plate 15 which is threaded onto the sleeve 12 by means of a thread 16 and is secured against undue rotation by means of a threaded ring 17. The central portion of the actuating lever 2 also has connected thereto a ball 18 which serves for journalling the actuating lever 2 while permitting the latter to move in all directions due to the fact that the ball is longitudinally slidably guided in bushing 19. For purposes of improving the gliding facility for the ball 18, bushing 19 is lined with a sleeve 20 of synthetic material with a low friction coefficient. This sleeve 20 may, for instance, be of the material known under the trademark "Teflon." Bushing 19 is fixedly connected to housing 3.

In view of the cardanic journalling of the actuating lever 2, the operator can move the lever 2 into eight different positions of which two positions each are in pairs located opposite to each other and perpendicular to the adjacent pair. But means of the swash-plate 15 connected to sleeve 12, these lever positions are respectively conveyed to associated valves 4, 5, 6 and 7 whereby the respective consumer associated with the respective valve is actuated. Such consumer may, for instance, be a hydraulic cylinder-piston system.

As will be evident from the above, the actuating mechanism according to the present invention permits a remote control of valves which requires a number of different lever positions and does so without lossing the fine sensitivity which is possible with directly controlled valves.

It is, of course, to be understood, that the present invention is, by no mean, limited to the particular construction shown in the drawings, but also comprises any modifications within the scope of the invention.

What we claim is:

1. In combination with valve housing means, a valve actuating mechanism, especially for controlling hydraulic circuits with two and more consumers, which includes: actuating lever means having a first end and a second end, a first ball connected to said first end of said lever means, a second ball connected to said lever means in spaced relationship to said second end of said lever means and to said first ball, first bearing means stationarily arranged with regard to said housing means and displaceably supporting said second ball, supporting means connected to and supported by said housing means, a third ball connected to and supported by said supporting means in spaced relationship to said first ball, second bearing means journalling said first and third balls and displaceable by said lever means and said first ball thereon, and swash-plate means supported by and connected to said second bearing means and pivotable in conformity with the displacement of said first ball by said lever means for actuating elements of a valve.

2. A valve actuating mechanism according to claim 1, in which said second bearing means includes sleeve means surrounding both said first ball and said third ball, and having that end thereof which is adjacent said third ball provided with a radially inwardly extending flange having an inner conical surface slidably engaging a peripheral portion of said third ball, spacer means interposed between said first and third balls, ring means arranged within said sleeve adjacent said first ball and having an inner conicol surface slidably engaging a portion of said first ball, and means for keeping said ring means within said sleeve means.

3. A valve actuating mechanism according to claim 2, in which said spacer means is provided with two coaxially arranged oppositely flaring conical surfaces respectively slidably engaging said first and third balls.

References Cited
UNITED STATES PATENTS 2,958,233　11/1960　Johnson _____ 74—471
3,131,573　5/1964　Bent _____ 74—471

MILTON KAUFMAN, Primary Examiner

U.S. Cl. X.R.

137—636.2